United States Patent [19]

Young

[11] Patent Number: 5,720,387
[45] Date of Patent: Feb. 24, 1998

[54] COMPACT DISK STORAGE COMPARTMENT

[75] Inventor: Michael Young, Taipei, Taiwan

[73] Assignee: Pantech International Inc., Taipei, Taiwan

[21] Appl. No.: 782,678

[22] Filed: Jan. 15, 1997

[51] Int. Cl.⁶ ................................. B65D 85/30
[52] U.S. Cl. ................... 206/308.1; 206/387.15; 312/9.11; 312/330.1
[58] Field of Search ................. 206/308.1, 309, 206/311, 312, 387.15; 312/9.9, 9.11, 9.16, 9.17, 9.53, 330.1

[56] References Cited

U.S. PATENT DOCUMENTS

| 1,219,975 | 3/1917 | McVay | 312/9.11 |
| 4,453,785 | 6/1984 | Smith | 312/9.48 |
| 4,932,522 | 6/1990 | Milovich | 206/308.1 |
| 5,207,319 | 5/1993 | Hamada | 206/308.3 |
| 5,255,970 | 10/1993 | Theosabrata | 312/330.1 |
| 5,636,752 | 6/1997 | Gallagher | 206/387.15 |

Primary Examiner—Paul T. Sewell
Assistant Examiner—Nhan T. Lam
Attorney, Agent, or Firm—Bacon & Thomas

[57] ABSTRACT

An improved compact disk storage compartment including a hollow compartment body for accommodating a plurality of compact disks, a front cover for closing the compartment body and having a plurality of outlets for passage of the compact disks, a handle pivotally disposed at one side of the compartment body and turnable about a determined angle for pushing out a selected compact disk; and an indicating element capable of displacing along one side of the compartment body and the front side of the front cover to indicate the position of the selected compact disk. The handle may synchronously displace with the indicating element to the position of the selected compact disk so that, when the handle is turned, the selected compact disk may be pushed out of the corresponding outlet.

8 Claims, 10 Drawing Sheets

COMPACT DISK STORAGE COMPARTMENT

BACKGROUND OF THE INVENTION (a) Field of the Invention

The present invention relates generally to a compact disk storage compartment, and more particularly to an improved compact disk storage compartment which may store a multiplicity of compact disks in which the selected compact disks may be quickly pushed out from the compartment for use.

(b) Description of the Prior Art

There are many kinds of known compact disk storage devices. One is an open type compact disk rack having a plurality of openings into each of which a compact disk pack may be inserted. The disadvantages with the compact disk rack is that it is not enclosed and it is not convenient to locate or remove the compact disks.

SUMMARY OF THE INVENTION

It is therefore an object of the present invention to provide a compact disk storage compartment to solve the drawbacks with the prior art. According to the present invention, the compact disk storage compartment essentially comprises a hollow compartment body for accommodating a plurality of compact disks, a front cover for closing the compartment body and having a plurality of outlets for passage of the compact disks, a handle pivotally disposed at one side of the compartment body and turnable about a determined angle for pushing out a selected compact disk; and an indicating element capable of displacing along one side of the compartment body and the front side of the front cover to indicate the position of the selected compact disk. The handle may synchronously displace with the indicating element to the position of the selected compact disk so that, when the handle is turned, the selected compact disk may be pushed out of the corresponding outlet.

It is another object of the present invention to provide an improved compact disk storage compartment to prevent possible scratching of compact disks, in which the mounting plates in a compartment body for supporting the compact disks are provided with gaps sufficient for the passage of the compact disks, and every two adjacent fins of the mounting plates have an inclined angle for reducing contact with the compact disks and preventing scratching of the recorded portions.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
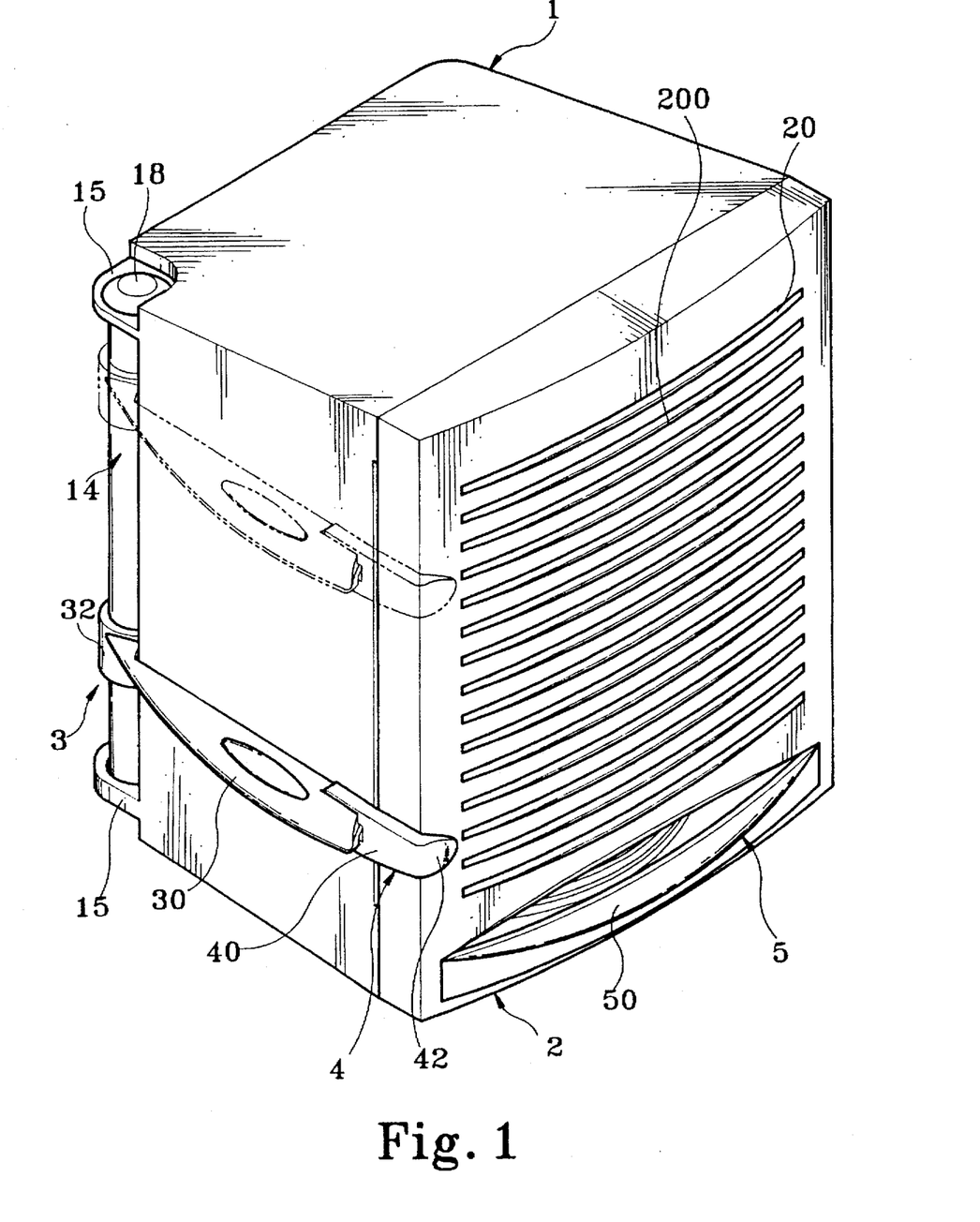
FIG. 1 is an elevational view of the present invention.
Figure 2:
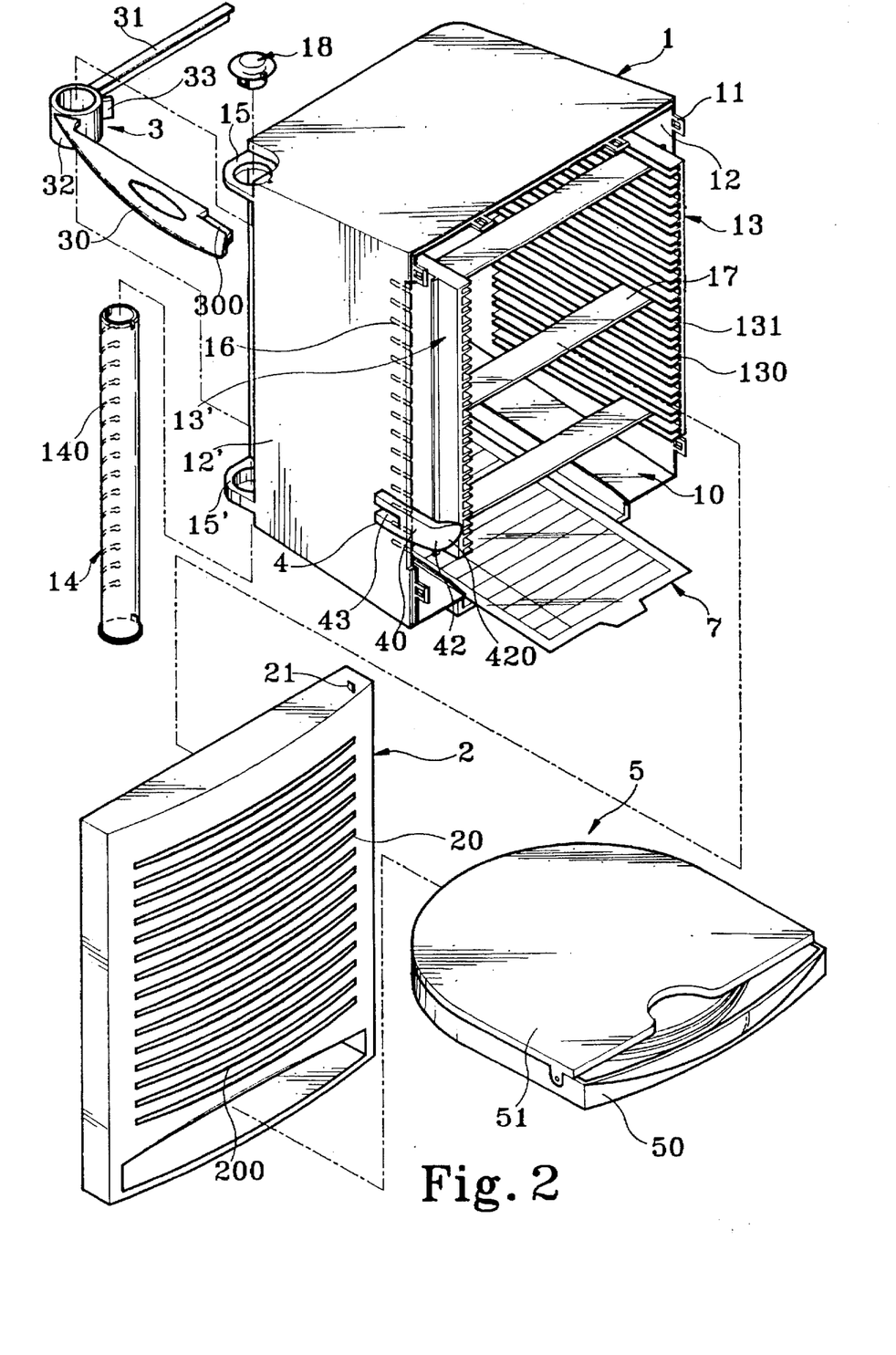
FIG. 2 is an exploded view of the present invention.

With reference to FIGS. 1 and 2, the compact disk storage compartment according to the present invention essentially comprises a hollow compartment body 1 for accommodating a plurality of compact disks; a front cover 2 for closing the compartment body 1, the front cover 2 having a plurality of outlets 20 for passage of a compact disk 6 from or into the compartment body 1 (see FIG. 4); a handle 3 pivotally disposed at one side of the compartment body 1 and capable of turning through a determined angle; and an indicating element 4 capable of displacing along one side of the compartment body 1 and the front side of the front cover 2 for indicating the selected compact disk 6. Besides, the handle 3 may displace along the axial direction with the the indicating element 4 synchronously to the location of any compact disk 6, and upon the turning of the handle 3, the selected compact disk 6 may be pushed out of the compartment body 1 via the corresponding outlet 20. In this way, selected compact disks may be removed from the compartment body 1 speedily.

Figure 3:
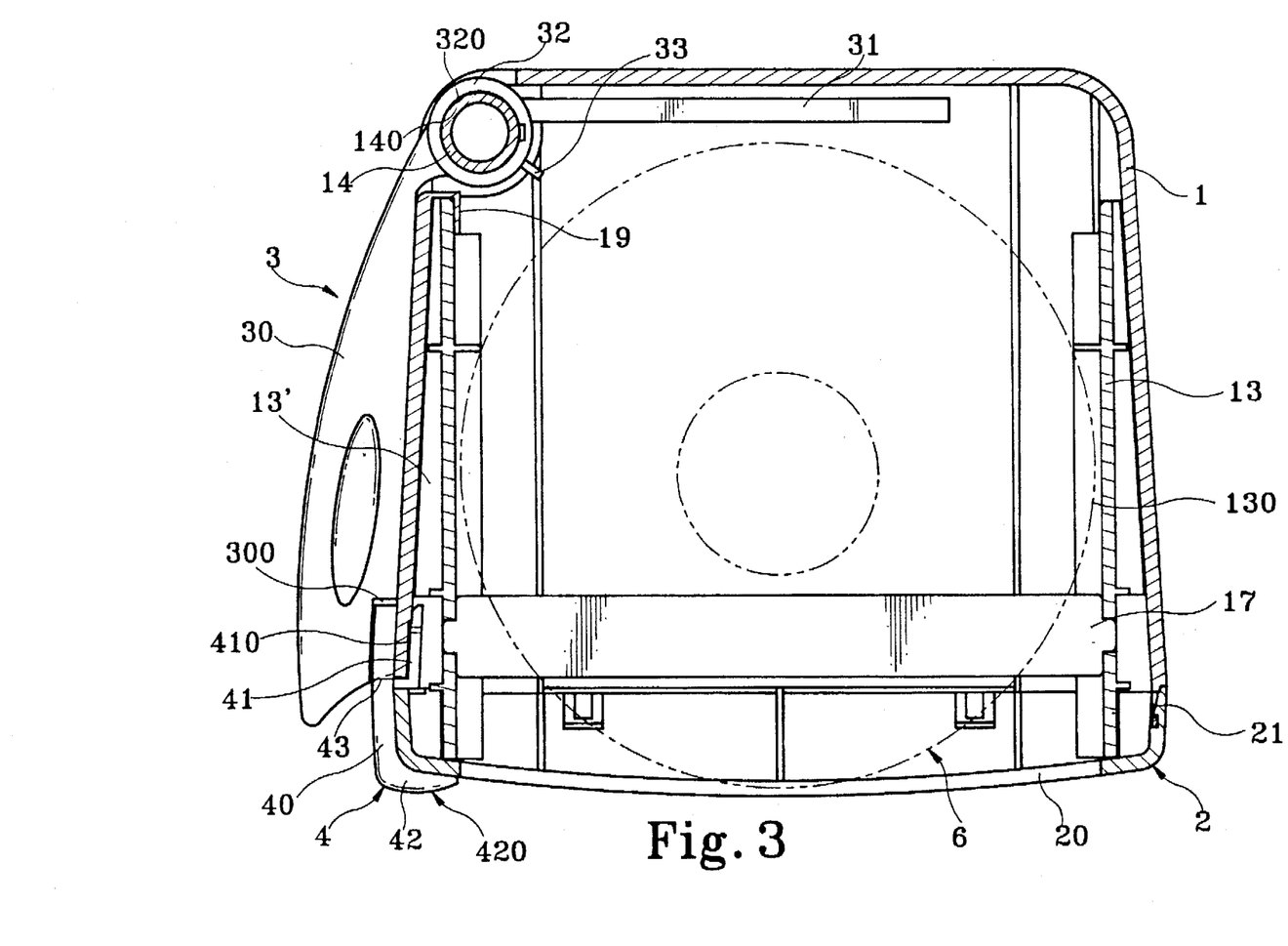
FIG. 3 is a sectional view of the present invention.
Figure 8:
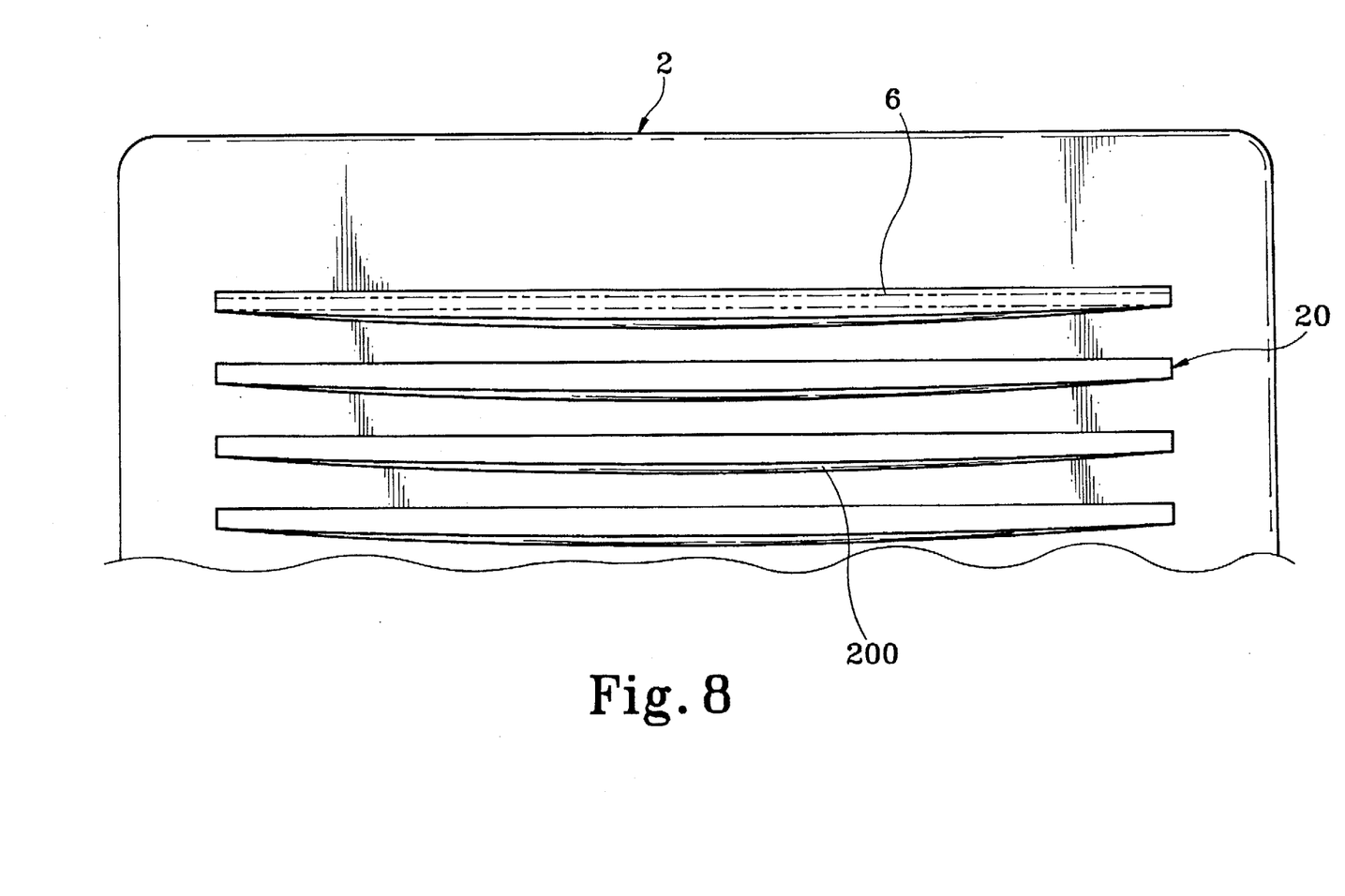
FIG. 8 is a front view of a front cover according to the present invention in part.

The compartment body 1 has a front facing opening 10 and a plurality of ring-shaped ears 11 at the edges of the opening 10. The front cover 2 has a plurality of inverted hooks 21 at its inner walls for engaging the ears 11 such that, upon engagement, the front cover 2 may completely close the opening 10. Inside the compartment body 1 at the facing walls 12, 12', there are respectively provided two symmetrical mounting plates 13, 13'. At the sides facing each other, the mounting plates 13 and 13' have a plurality of parallel and projecting fins 130. A plurality of beams 17 are further mounted between the mounting plates 13 and 13' to provide a lateral support for the compartment body 1. The fins 130 have gaps 131 amongst them to hold the compact disks 6 and to allow sufficient space for their movement. When a compact disk 6 is placed in a gap 131, the compact disk 6 will have its periphery supported at least three spots by the fins 130 and 130' as well as the upper rim of the corresponding outlet 20. Such a three point support may secure the compact disk 6 inside the compartment body 1, as shown in FIG. 3. In addition, an axle 14 maybe disposed at the outer side of the compartment body 1 near its edge. The axle 14 is inserted through two ring-shaped bearings 15 and 15' of the compartment body 1 and held thereby, with a cap 18 holding it in position. The axial direction of the axle 4 is the same as the piling direction of the compact disks 6. The surface of the axle 140 has a plurality of depressions 140 matching the number of the compact disks 6 inside the compartment body 1. The number of the outlets 20 is also equivalent to the number of gaps 131. The outlets 20 have a width and height sufficient to allow passage of the compact disks 6. As shown in FIG. 8, the bottom edge of each outlet 20 has a curved portion 200 at the bottom edge, curved portion 200 sinking slightly downward so that when the compact disk 6 passes through the outlet 20 only a very small portion of the outer periphery of the compact disk 6 is in contact with the outlet 20. As there is generally a distance of about several millimeters at the outer periphery of a compact disk that does not have any recorded information, the curve portion 200 may effectively prevent the recorded portion from being scratched. Certainly, it is preferable to place the compact disks 6 with the recorded side upon down when they are inserted into the gaps 131. In this way, the recorded side of the compact disk 6 may be prevented from dust. Furthermore, adjacent fins 130 have an inclined angle which may enable the section of the gap 131 therebetween to have a substantially flared shape so as to reduce the area of contact between the compact disk 6 and the fins 130 and thus prevent the scratching of the recorded side of the compact disk 6.

Figure 4:
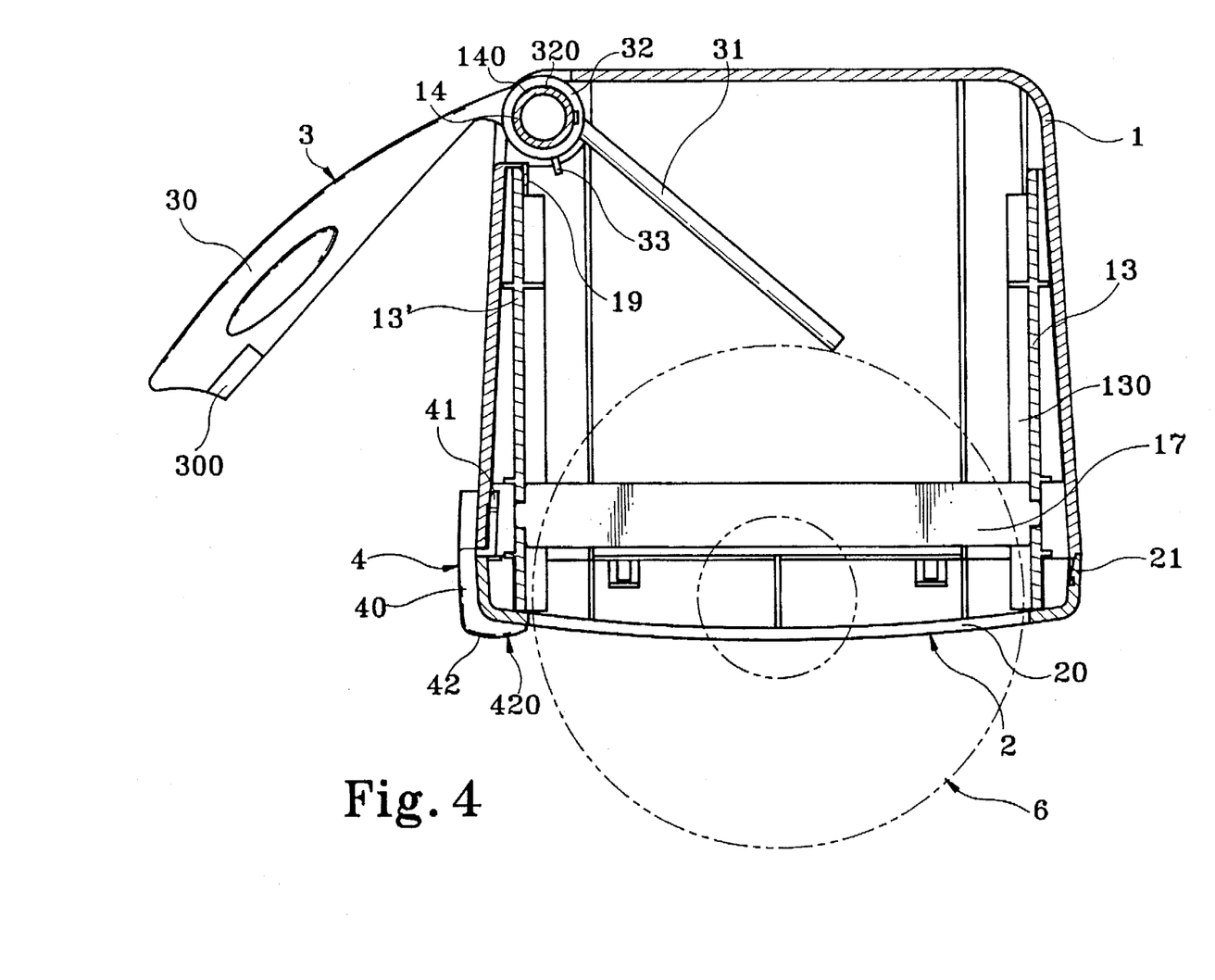
FIG. 4 is sectional view of the present invention, illustrating the pushing out of a selected compact disk from a compartment body.
Figure 5A:
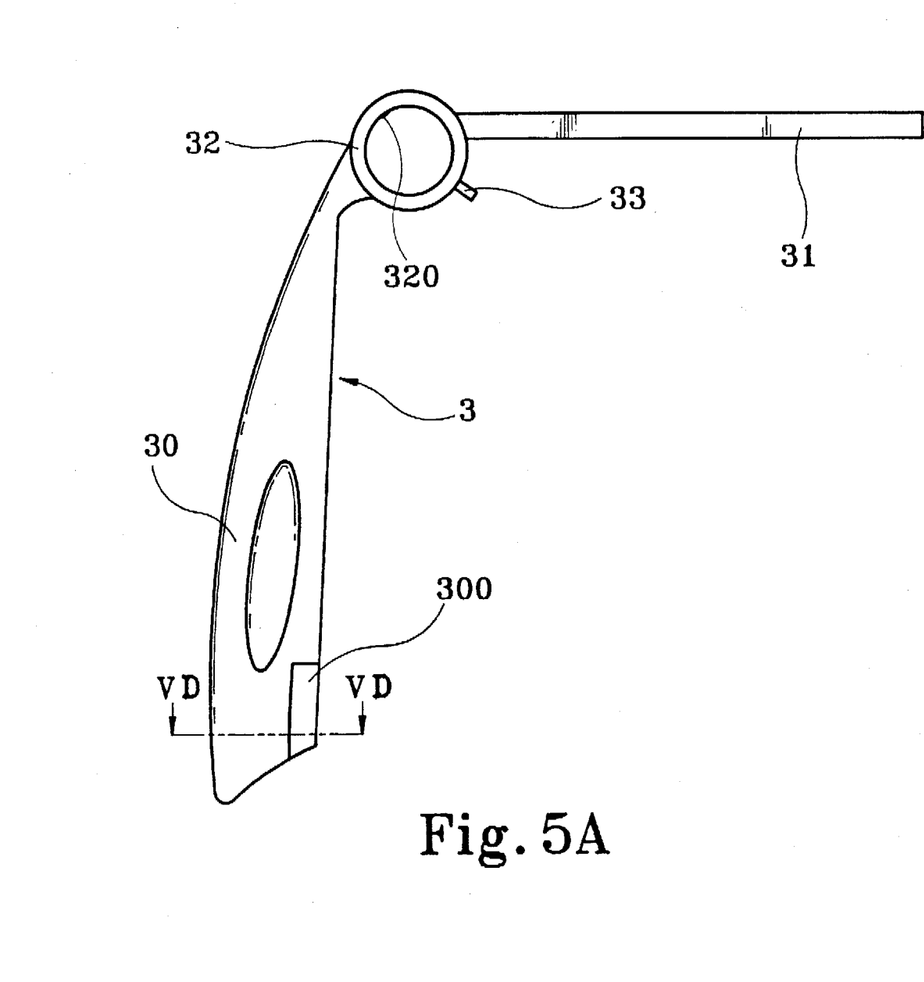
FIG. 5A is a front view of a handle according to the present invention.
Figure 5B:
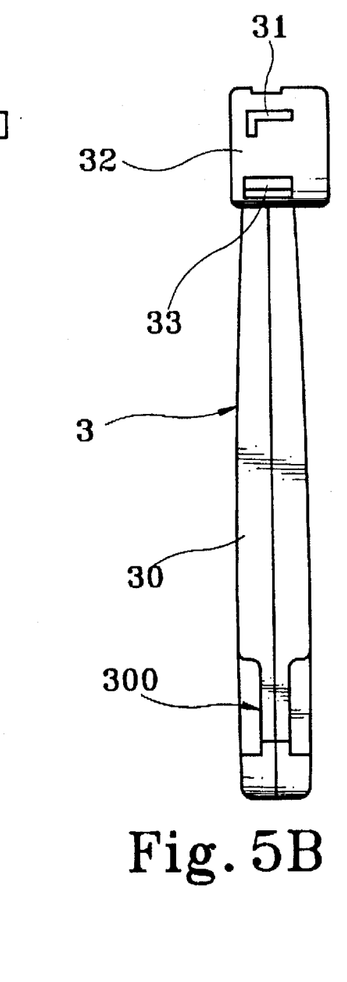
FIG. 5B is a right side view of FIG. 5A.
Figure 5C:
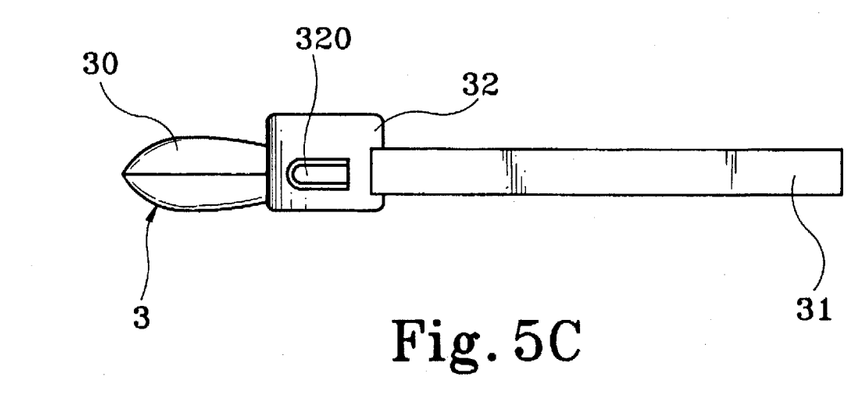
FIG. 5C is a top view of FIG. 5A.
Figure 5D:
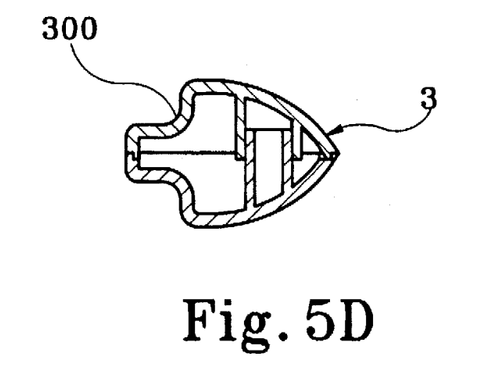
FIG. 5D is a sectional view taken along line VD—VD of FIG. 5A.
Figure 6A:
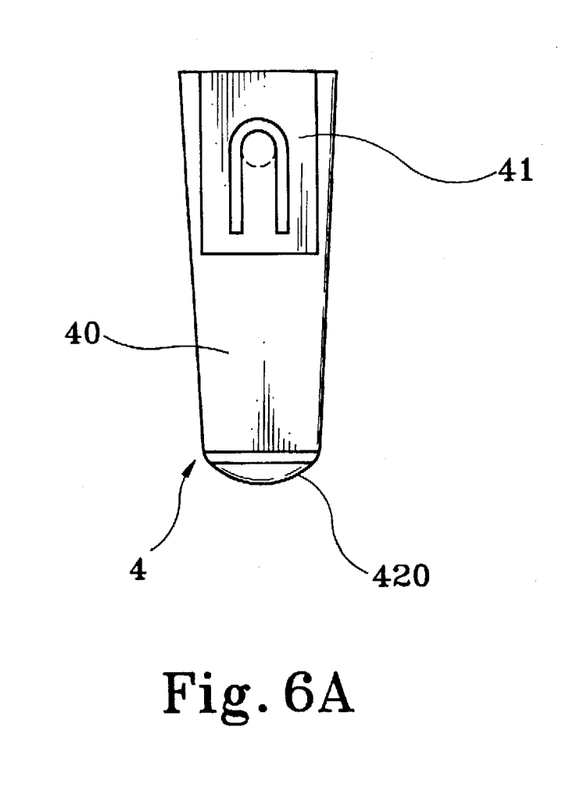
FIG. 6A is a front view of an indicating element according to the present invention.
Figure 6B:
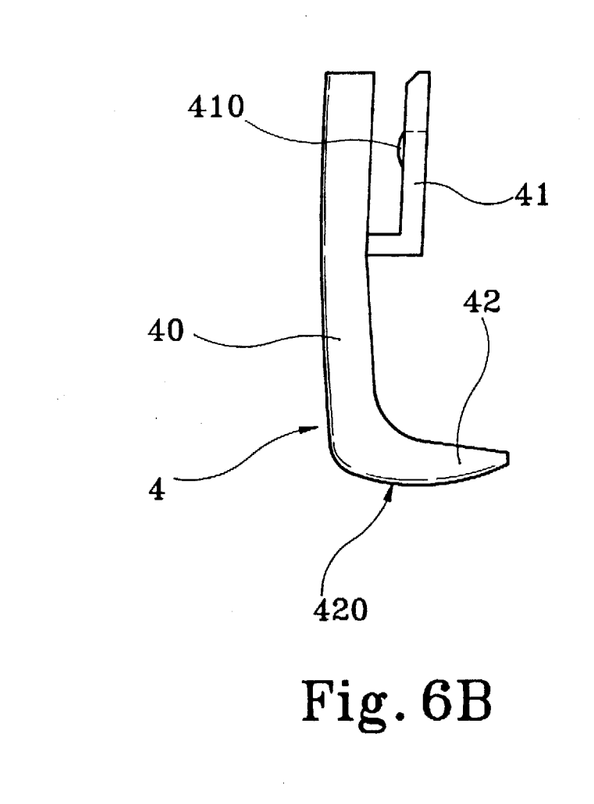
FIG. 6B is a lift side view of FIG. 6A.
Figure 6C:
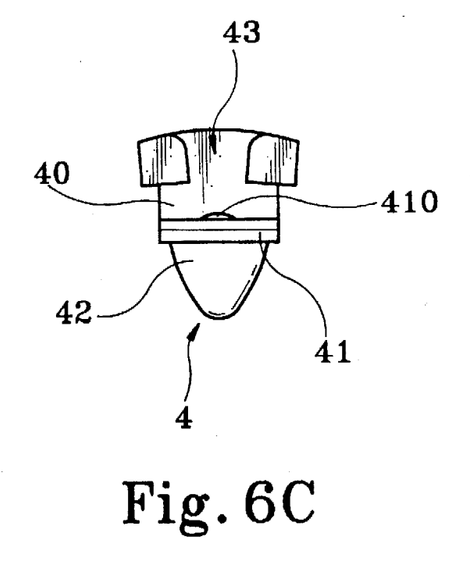
FIG. 6C is a top view of FIG. 6A.
Figure 6D:
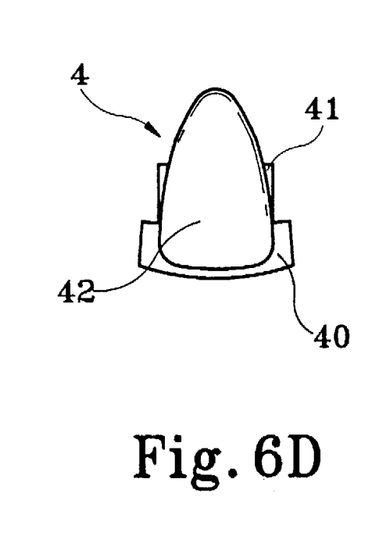
FIG. 6D is a bottom view of FIG. 6A.
Figure 7:
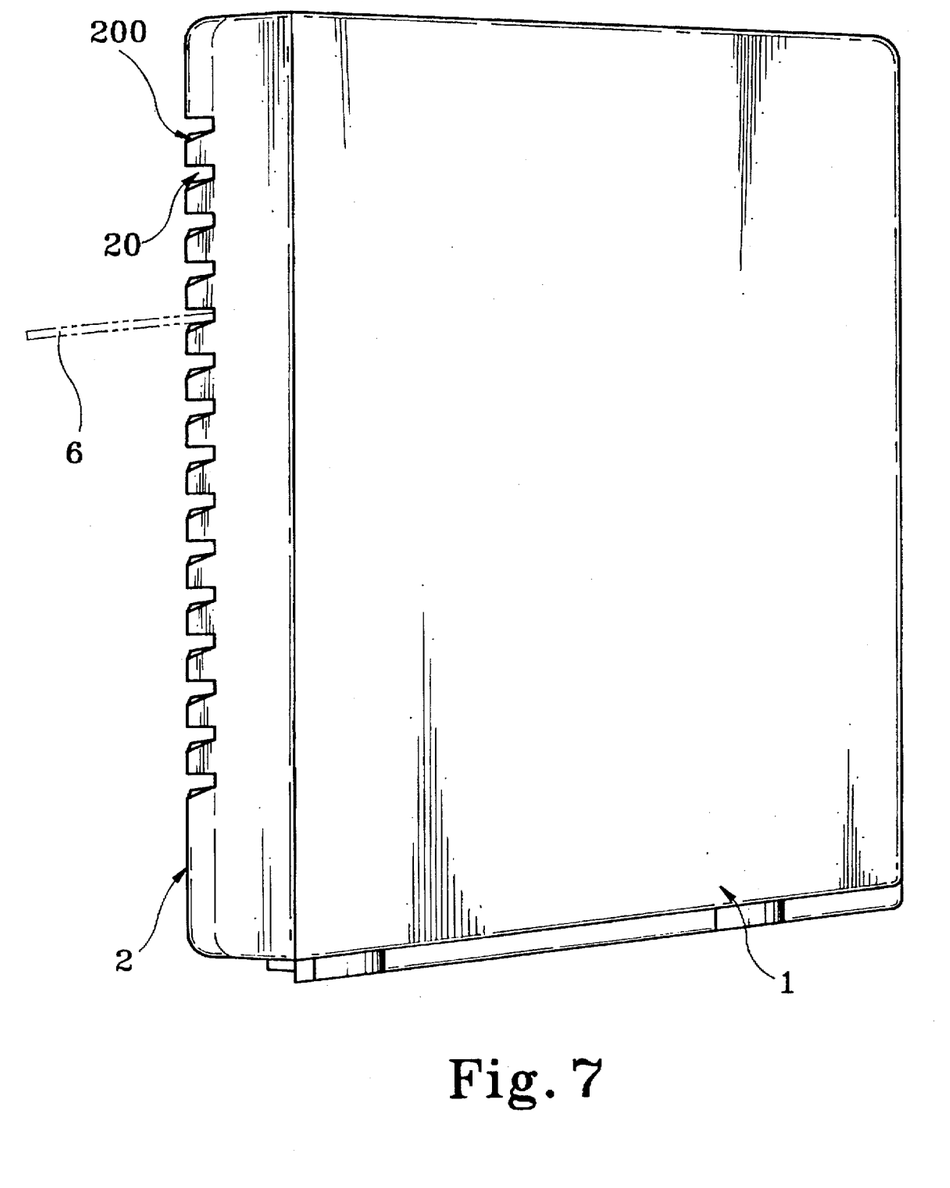
FIG. 7 is a side view of the present invention.

Referring to FIGS. 5A–5D, the handle 3 includes a grip portion 30, a lever 31 and a pivot 32 between the grip portion 30 and the lever 31. The pivot 32 is a ring-shaped structure movably fitted onto the axle 14. An angle is defined between the grip portion 30 and the lever 31. Referring to FIG. 3, when he grip portion 30 lies against the outer side of the compartment body 1, the lever 31 will be located at a position for pushing out a selected compact disk 6 (to be more specific, behind the compact disk 6 or at the radial direction of the compact disk 6 such that it may push the compact disk 6 out through the outlet 20). the pivot 32 further has a resilient portion 320 for matching the depressions 140 so that the handle 3 may freely displace along the axle to the position of any selected compact disk 6. Referring to FIG. 4, when the user turns the handle 3, the lever 31 inserted into the interior of the compartment body 1 and located at one side of the selected compact disk 6 may push the compact disk 6 along the gaps 131 so that the compact disk 6 projects from the outlet 20. The pivot 32 further has a projection 33 which, after over half of the area of the compact disk 6 has pushed out of the outlet 20, may contact a stop portion 19 at the inner side of the compartment body 1 to stop movement of the handle 3. At this point the center hole of the compact disk 6 is just partly exposed on the outside of the outlet 20, and the compact disk 6 slants slightly downward to facilitate removal, as shown in FIG. 7.

With reference to FIGS. 6A–6D, the indicating element 4 is a transparent structure having a straight main portion 40 and a clamping portion 42 parallel to the main portion 40, and an enlarged portion 42 bending from the front end of the main portion 40 to the edge of the front cover 2. The clamping portion 42 has a spherical protrusion 410 projecting towards the main portion 40. The clamping portion 41 may just fit in any one of a plurality of sunken positioning portions 16 at the side of the compartment body 1 and may remain stationary when at any positioning portion 16 for indicating the position of the selected compact disk 6. The enlarged portion 42 at least has a raised curved surface 420 for magnifying the compact disk indicating signs (numerals or letters) at the edge of the front cover 2 for better identification purposes. The main portion 40 further has a notch 43 engageable with a front end 300 of the grip portion 30 of the handle 3. In this way, when the user wishes to withdraw a desired compact disk 6, he/she will just need to press the grip portion 30 to engage it with the notch 43 in order to move the handle 3 and the indicating element 4 synchronously. By means of the magnifying function of the enlarged portion 42, the user may correctly locate the selected compact disk 6, as shown in FIG. 1, and push the compact disk 6 out of the compartment body 1 by turning the handle 3, as shown in FIG. 4.

As shown in FIGS. 1 and 2, at the lowermost part of the compartment body 1, there is provided a portable compact disk box 5 in the form of a drawer, and a memo pad 7 for noting the contents of the compact disks 6. The compact disk box 5 is comprised of a bottom 50 and an openable top cover 51 pivotally disposed on the bottom 50. The user may remove the compact disk box 5 from below the compartment body 1 and put a selected number of compact disks 6 into the compact disk box 5 when going outdoors.

In summary, the present invention has the following advantages:

1. The compartment body may store a plurality of compact disks and a selected compact disk may be quickly located and removed from the plurality of compact disks. The present invention is provided with an indicating element and a handle capable of displacing synchronously with the indicating element. The handle may turn about a determined angle on its pivot and push the selected compact disk out of the compartment body.

2. The present invention is provided with a portable compact disk box for holding a plurality of compact disks so that the user may carry the compact disks safety in the box.

Although the present invention has been illustrated and described with reference to the preferred embodiment thereof, it should be understood that it is in no way limited to the details of such embodiment but is capable of numerous modifications within the scope of the appended claims.

I claim:

1. An improved compact disk storage compartment, comprising:

a hollow compartment body for accommodating a plurality of compact disks;

a cover for closing said compartment body said front cover having a plurality of outlets for passage of said compact disks;

a handle pivotally connected to said compartment body in a movable relationship and capable of turning about a determined angle, said handling having a grip portion and a lever with an internal angle defined therebetween, said angle referring to a position in which said grip portion is lying against the outer side of said compartment body while said lever is located at a position for pushing out a selected compact disk; said lever capable of pushing out the selected compact disk through the corresponding outlet of said front cover when said handle is turned; and an indicating element capable of displacing along one side of said compartment body and the front side of said front cover, aid indicting element having a notch engageable with one end of said handle such that said indicating element may displace synchronously with said handle to indicate the position of the selected compact disk.

2. An improved compact disk storage compartment as claimed in claim 1, wherein said compartment body has a front facing opening and plurality of ring-shaped ears at the edges of said opening; and said front cover has a plurality of inverted hooks for engaging said ring-shaped ears.

3. An improved compact disk storage compartment as claimed in claim 1, wherein said compartment body has two symmetrical mounting plates disposed at two opposite inner side walls thereof, the facing sides of said mounting plates being respectively provided with a plurality of parallel and projected fins spaced a distance apart from each other such that a gap is defined between adjacent fins sufficient for movement of a compact disk.

4. An improved compact disk storage compartment as claimed in claim 1, wherein said outlets of said front cover each has a curved portion at a bottom edge thereof, said curved portion sinks slightly downward.

5. An improved compact disk storage compartment as claimed in claim 1, wherein said an axle is disposed at the outer side of said compartment body near the edge, said axle being disposed at an axial direction identical to the piling direction of said compact disks, said handle being pivotally fitted onto said axle.

6. An improved compact disk storage compartment as claimed in claim 5, wherein said axle has a plurality of depressions formed on its surface, the number of said depressions being equivalent to that of said compact disks stored in said compartment body; and said handle has a pivot portion located between said grip portion and said lever, said pivot portion being pivotally fitted onto said axle in a movable relationship; said pivot portion further having a resilient portion for matching said depressions of said axle such that said handle may freely displace along said axle to the position of a selected compact disk.

7. An improved compact disk storage compartment as claimed in claim 5, wherein said pivot portion of said handle further has a projection, and said compartment body has a stop portion at an inner side thereof, said stop portion capable of stopping said handle from turning when over half of the area of a selected compact disk has been pushed out of the corresponding outlet and said projection contacts said stop portion.

8. An improved compact disk storage compartment as claimed in claim 1, wherein said indicating element is transparent and has a clamping portion clamping a side wall of said compartment body, and an enlarged portion extending to the front of said front cover, said enlarged portion having a raised curved surface.

* * * * *